May 1, 1956 D. F. DROW 2,743,870
THERMOSTATICALLY OPERATED FUEL VALVE FOR HEAT APPLIANCES
Filed May 8, 1952 2 Sheets-Sheet 1

INVENTOR.
Donald F. Drow

May 1, 1956  D. F. DROW  2,743,870
THERMOSTATICALLY OPERATED FUEL VALVE FOR HEAT APPLIANCES
Filed May 8, 1952  2 Sheets-Sheet 2
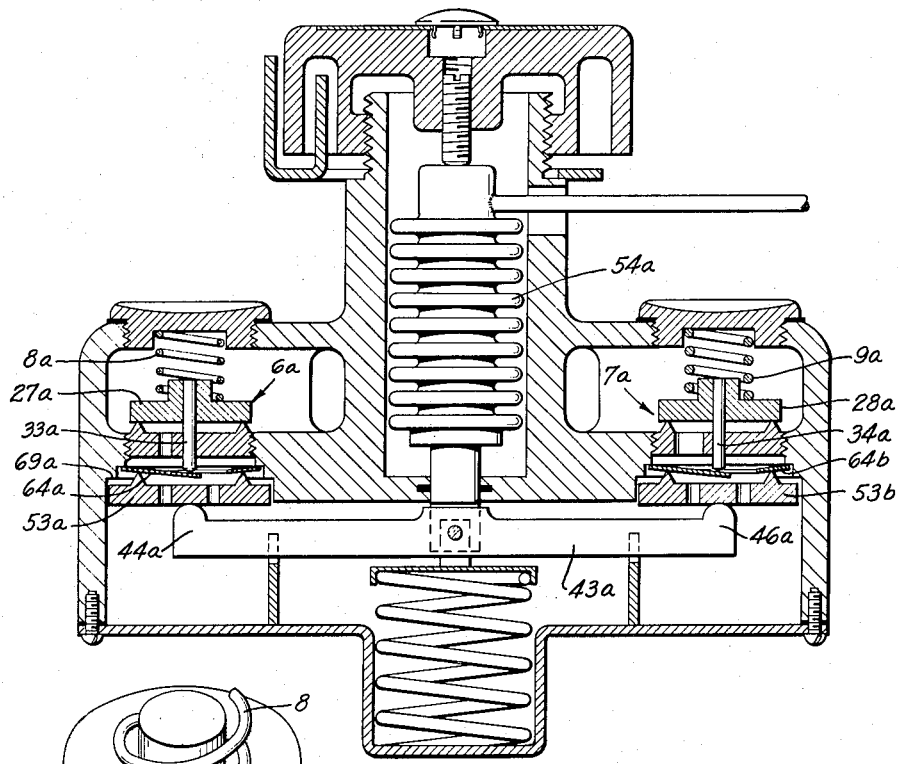
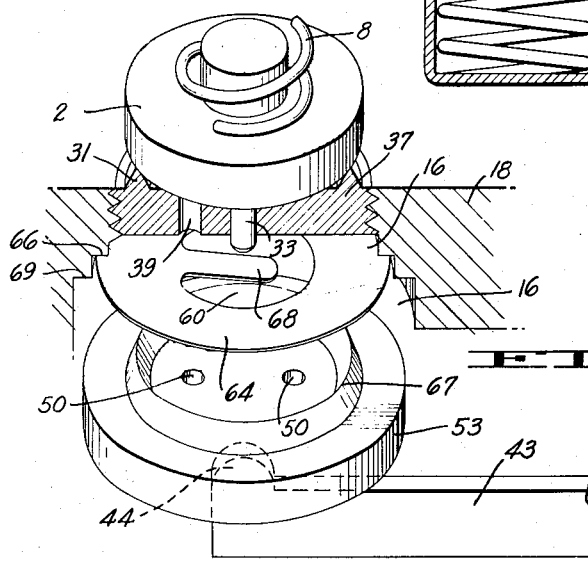
INVENTOR.
Donald F. Drow

United States Patent Office 2,743,870
Patented May 1, 1956

2,743,870

THERMOSTATICALLY OPERATED FUEL VALVE FOR HEAT APPLIANCES

Donald F. Drow, Los Angeles, Calif., assignor to Minneapolis-Honeywell Regulator Company, a corporation of Delaware Application May 8, 1952, Serial No. 286,715

14 Claims. (Cl. 236—48)

The invention relates to thermostatically operated valves and particularly those adapted to control the flow of fuel to a burner in a heat appliance in accordance with temperature changes.

In one preferred type of thermostatically operated valve of the character described, a pair of valves are used in conjunction with a thermostatic actuator therefor in an arrangement wherein the valves are sequentially opened upon decreasing temperature and sequentially closed upon rising temperature. It has been further proposed to insert in the connection to the first opening valve a snap acting device so as to obtain a snap opening and snap closing of such valve, thereby affording the advantages inherent in snap actuation for providing a minimal fuel flow to the burner. In such arrangements the second opening valve may be graduating in its operation to thereby obtain the precise temperature regulation afforded by this type of valve.

In accordance with the present invention, and as a principal object thereof, I provide a thermostatically operated fuel control valve of the character described, which incorporates an improved means for providing the sequential operation of a plurality of valves to supply a minimal fuel flow followed by a graduated fuel supply proportional to decrease in temperature and a reverse order of closing of the valves upon increasing temperature.

Another object of the present invention is to provide a thermostatically operated fuel valve of the character above, which utilizes a single bellows type thermostat responsive to temperature changes in conjunction with a leverage system providing the aforesaid sequential valve operation, and in which selective snap action of the valves may be obtained, amplification of bellows movement is afforded as well as overload safety protection for the bellows and also an improved arrangement for manually controlling the operating temperatures at which the valves are opened and closed.

The invention possesses other objects and features of advantage, some of which, with the foregoing, will be set forth in the following descriptions of the preferred form of the invention which is illustrated in the drawings accompanying and forming part of the specification. It is to be understood, however, that variations in the showing made by the said drawings and description may be adopted within the scope of the invention as set forth in the claims.

Referring to said drawing:

Figure 3 is a fragmentary exploded perspective view of one of the valves of the device and the supporting and operating structure therefor, the view being taken on a somewhat enlarged scale from Figures 1 and 2.

Figure 4 is a vertical cross-sectional view similar to Figure 2, but showing a modified form of the device.

Figure 1:
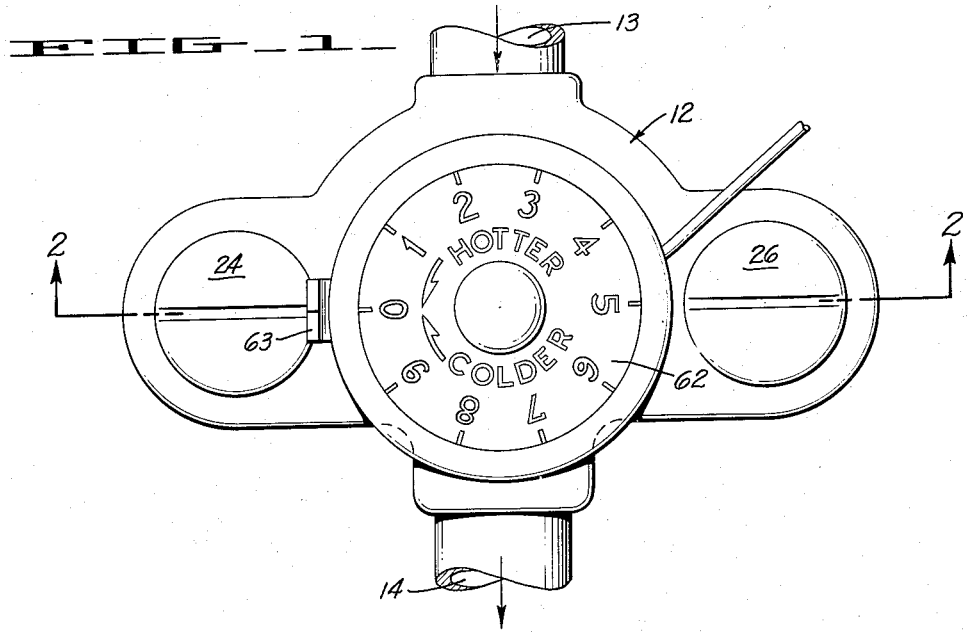
Figure 1 is a plan view of a thermostatically operated fuel valve constructed in accordance with the present invention.

The fluid flow control device of the present invention, and as illustrated in the accompanying drawings, includes a plurality of valves, here shown as a pair of valves 6 and 7, connected in parallel flow relation, and spring means 8 and 9 connected to each of the valves for urging them to closed position, together with force and movement transmitting means 11 connected to the valves for moving them to open position against the spring means 8 and 9, which are formed to offer unequal resistance to the opening of the valves whereby, upon displacement of the means 11 in a valve opening direction, the valves will be successively opened in the order of the increasing resistance offered by the spring means. As here shown, the control preferably comprises a unitary structure mounted in a housing 12 formed with inlet and discharge passages 13 and 14 respectively, and a plurality of passageways 16 and 17 formed in a dividing wall 18 of the housing and arranged in parallel flow connection between the inlet and discharge passages. The valves 6 and 7 are mounted in the passageways 16 and 17 respectively for controlling the fluid flow between chambers 19 and 21, provided in the housing on opposite sides of the wall 18 and communicating with the inlet and discharge passages 13 and 14 respectively. Access to the chambers 19 and 21 for inspection of the parts may be conveniently provided by removably attaching the bottom wall 22 to the main portion of the housing by means of screws 23 and by providing suitable threaded closure members 24 and 26 sealing a pair of openings formed in the upper wall of the housing, see Figure 2.

Figure 2:
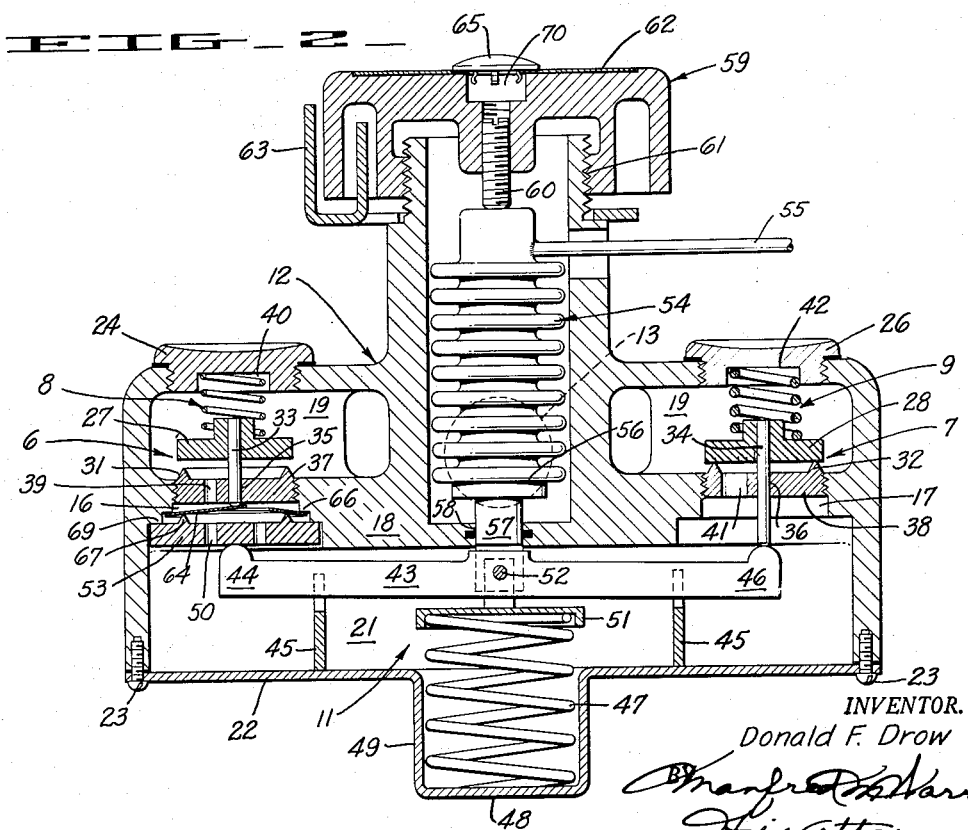
Figure 2 is a vertical cross-sectional view of the valve taken substantially upon the plane of line 2—2 of Figure 1.

As may be seen in Figures 2 and 3 of the accompanying drawing, the valves forming the means 6 and 7 here consist of a pair of valve members 27 and 28, which are mounted within chamber 19 for axial movement toward and away from knife edge valve seats 31 and 32 carried by the housing in surrounding relation to the above mentioned connecting passageways 16 and 17. The valve members 27 and 28 are maintained in alignment with their respective valve seats by means of axially extending valve stems 33 and 34 which are reciprocally slidable in axial bores 35 and 36, formed centrally of the valve seats. As here shown, the valve seats 31 and 32 and bores 35 and 36 are provided in replaceable disk shaped members 37 and 38 having threaded peripheries engaged with corresponding threads formed on the walls defining the passages 16 and 17. The flow through the valves is here determined by the provision of one or more orifices 39 and 41 in the seat members 37 and 38 and desired changes in the rate of flow may conveniently be made by replacing these members with similar members having different size orifices. The spring means 8 and 9 here consist of helical springs fitted upon spring rests formed on the valve members 27 and 28 and have their opposite ends mounted within spring end receiving sockets 40 and 42 provided in the closures 27 and 28 which are arranged in axial alignment with the valve members. The springs are held under compression so as to constantly urge the valve members to closed positions on their seats.

The force and movement transmitting means 11 here includes a floating lever 43 mounted within the chamber 21 and operatively connected at its opposite ends 44 and 46 with the valves 6 and 7 for urging the latter to open position against the resistance of the springs 8 and 9 when the lever is displaced in a valve opening direction. The lever 43 is guided for movement in alignment with the valves by notched webs 45 carried by the closure plate 22. Forming part of the force and movement transmitting means 11 is a drive spring means which is adapted to displace the lever 43 toward the valves 6 and 7 to effect their opening. This spring means consists of a helical spring 47 mounted in the chamber 21 with its lower end bearing against the bottom portion 48 of a well 49 formed in the closure plate 22, and with its upper end bearing against a spring rest 51 pivotally connected as by pin 52 to the lever 43 intermediate its ends. In order to overcome the resistance of the springs 8 and 9 to opening of the valves 6 and 7, the drive spring 47 provides an expansive strength considerably in excess of the total resistance afforded by the springs 8 and 9.

As above described, the desired sequential operation of the valves 6 and 7 is accomplished by providing spring means 8 and 9 which have differing resistances to opening of their associated valves. As will be understood, however, the mechanical advantage afforded by the lever and its connections to the valve may also be utilized to assure the desired sequential operation. In the present device, this mechanical advantage cooperates with the resistance of the spring means, with the spring 9 being shown as somewhat heavier than spring 8, so that the valves will be successively opened in the order of increasing resistance offered by the springs. It will thus be seen that, as the lever 43 is displaced toward the wall 18 by the spring 47, the lever end 46 will pivot upon the valve stem 34 as a fulcrum to swing the opposite lever end 44 to open valve 6. In accordance with the present construction this initial movement of the lever is halted, by an actuator element 53 herein later described, after opening of valve 6, whereupon the fulcrum will shift to the end 44 of the lever to swing the lever, to open the valve 7. Upon return movement of the lever 43, the lever will first fulcrum about the end 44 until the valve member 28 is returned to closed position under the influence of the spring 9 and as soon as the valve is completely closed the fulcrum will again shift to the lever end 46 to allow closing of the valve 6 under the influence of spring 8.

In accordance with the present invention, the displacement of the lever 43, as aforesaid, is effected by temperature responsive actuator means connected to the lever intermediate the connections to valves 6 and 7 and adapted to move the lever in a valve opening direction upon decreasing temperature and in a valve closing direction upon increasing temperature. This temperature responsive means here includes a thermostatic bellows 54 mounted in the housing in mutual compression to the drive spring 47, and having a conduit 55 extending therefrom to a remotely mounted bulb (not shown) containing a temperature responsive fluid. In the device illustrated, the bellows 54 and spring 47 are mounted in axial alignment and in direct opposition to each other with the spring being compressed between a lower end 56 of the bellows and the housing. Connection of the bellows to the lever 43 is effected by means of a member 57 engaged with the bellows end 56 and slidably mounted in an opening 58 in the wall 18, the member 57 being pivotally connected at its lower end to the pin 52, coincidentally with the spring rest 51.

As a safety feature, the construction of the present control is adapted to prevent damage to the bellows by extreme high or low temperatures. As will be apparent from Figure 2 of the drawing, the bellows is carried by the housing in compressed relation between a control knob 59, later to be described, and member 57 which is urged toward the bellows by spring 47 with no fixed attachment being required or made between the bellows and the control knob or member 57. Accordingly, the bellows is free to contract indefinitely when the temperature drops below the operating range of the control. On the other hand, the spring 47 provides a resilient cushion to the expansion of the bellows so that the bellows is permitted to move to its full limits of expansion should an increase in temperature so require.

Actuation of the lever 43 and hence the valves 6 and 7 in response to temperature changes is determined by the opposed expansive forces of the mutually compressed bellows 54 and spring 47. The moving of the lever 43 in a valve opening direction is accomplished by the spring 47 as the bellows contracts in response to decreasing temperatures. Return movement of the lever in a valve closing direction is effected by the expansion of the bellows 54 in overcoming the resistance of the spring 47 in response to rising temperature.

Two general types of bellows thermostats may be used, namely the gas and liquid filled types. Since the degree of movement of such bellows is necessarily limited it is generally desired that the amount of valve opening be somewhat increased over bellows movement. Accordingly, and as an additional feature of the present device, provision is made through the lever 43 for amplification of the motion of the bellows. As previously mentioned, the lever 43 alternately pivots about its opposite ends 44 and 46 to operate the valves while at the same time the actuating spring 47 and bellows 54 is connected to the lever intermediate its ends. Thus a mechanical advantage results causing the lever end remote from the fulcrum to move a distance greater than the movement of the bellows. In the control as shown in the drawings, the pin 52 is located midway of the lever and hence the amount of movement of the free lever end will be twice the movement of the bellows. This relationship may be varied for different types of bellows and to obtain different valve openings.

Manually operable means is provided for causing the control to open and close the valves at desired temperatures by increasing or decreasing the amount of mutual compression between the bellows 54 and spring 47 to thus locate the pivot pin 52. This adjustment of the mutual compression between the spring and bellows is here accomplished by moving the knob 59 to and from the upper end of the bellows. For this purpose a threaded connection 61 is provided between the knob 59 and the housing so that rotation of the knob 59 in a clockwise direction, as viewed in Figure 1, will move the knob 59 toward the bellows, thus causing the valves to open at a lower temperature. Conversely, a counter-clockwise rotation of the knob 59 will move it away from the thermostat bellows 54 thus causing the valves to open at a relatively higher temperature. Conveniently, and as here shown, the upper surface 62 of the knob is provided with calibrations which cooperate with an index pointer 63 secured to the housing 12 to indicate the relative temperature of operation.

Adjustment of the control so that the calibrations on the dial knob will indicate a desired working range of temperature is here provided by a setscrew 60 axially threaded into the knob 59 and having its lower end bearing against the upper end of the bellows 54 so that appropriate rotation of the setscrew will vary the spacing between the knob and the bellows. If desired, a plug device 65 may be clipped into the opening 70 above the screw to protect access.

In use of the control with fluid fuel heating appliances, it is desirable to turn the above described minimal flow on and off as rapidly as possible for more efficient and safer operation of the burner. As here shown, a practically instantaneous opening of the valve 6 is provided by inserting an overcenter snap acting device in the connection of the lever 43 to the valve 6. Such a device here includes a clicker disk 64 of the general type disclosed in Vaughn Patent No. 1,988,345 mounted at its periphery and on its normally concave side upon a shoulder 66 provided in the housing surrounding the passage 16 and being engaged on its normally convex side near its periphery but inwardly of the shoulder 66 by an annular knife edge fulcrum 67 provided on the actuator member 53 above noted. The disk is formed with an open center and an inwardly extending tongue or arm 68 arranged in juxtaposition to the end of stem 33 of valve 27 for engaging the valve stem and displacing the valve to open position against the resistance of spring 8 when the disk is in its overcenter snapped position as shown in Figure 2. Accordingly, as lever end 44 moves in a valve opening direction, fulcrum 67 forces the disk toward a flattened position from where it will snap through center into a reverse position abruptly swinging the tongue 68 against the valve stem 33 to effect a snap opening of valve 27. The clicker disk here used is of the self-returning type and will spring back to its normal unstressed position shown in Figure 3 when the lever end 44 is moved in the valve closing or downward direction. The spring 8 will, of course, then snap the valve 27 to its closed position upon the valve seat 31.

As an important feature of the present invention, the movement of the actuator member 67 is limited so as to provide the dual functions of safeguarding the disk from being overstressed and also providing for the shifting of the fulcrum for lever 43 as above described. This is accomplished by halting the movement of the actuator member 53 in a valve opening direction at a position slightly past the point at which the clicker snaps to its overcenter position. For this purpose an annular shoulder 69 is formed on the wall 18 of the housing in surrounding relation to the clicker disk 64 for abutment with the upwardly arranged face of the actuator member at the position noted. Preferably the member 53 is formed with one or more openings 50 for affording full flow therethrough and registering with the open center 60 of the snap ring 64.

In accordance with the foregoing it will be seen that as the thermostat calls for heat by a contraction of the bellows 54, lever 43 will pivot at its end 46 about the outer end of valve stem 34 as a fulcrum to swing its opposite end 44 against the actuator member 53 to effect a snap opening of valve 27 and establish a minimal flow of fuel to the burner. This flow, established by the size and number of orifices 39, should be sufficient to afford safe and proper lighting of the burner from a pilot burner and ensuing stable operation. If the relatively small amount of heat thus provided maintains the desired temperature, valve 28 will remain closed. If such amount of heat or external conditions result in an increase of temperature, valve 27 will be snapped closed when the upper limit of temperature is reached for which the device is set. On the other hand, if the temperature continues to fall, the actuator member 53 will move to shoulder 69 when the fulcrum point for the lever shifts to end 44 thereby swinging the opposite end 46 against valve stem 34 to effect an opening of valve 28 against the resistance of spring 9. This valve will then graduate open or closed in direct proportion to change in temperature to provide a very precise response. As the temperature increases, valve 28 will graduate closed while valve 27 remains open and then finally valve 27 will be snapped closed as above described.

A modified form of the invention is illustrated in Figure 4 of the drawing wherein a plurality of sequentially operating valves 6a and 7a are provided as in the preferred embodiment, but all are made snap acting. This is accomplished by inserting a snap acting mechanism of the type hereinabove described in both of the operating connections between the lever ends 44a and 46a and the stems 33a and 34a of the valve members 27a and 28a. In order to obtain the desired sequential operation, the snap disk 64a used for the actuation of valve 6a is made somewhat lighter in weight and action than snap disk 64b used for the actuation of valve 7a. Thus when the thermostat calls for heat by a contraction of the bellows 54a, lever 43a will first pivot about its end 46a supported upon actuator member 53b as a fulcrum so as to swing its opposite end 44a against actuator 53a to effect a snap opening of valve member 27a and thereby establish a minimal flow of fuel to the burner. If the temperature continues to drop, actuator 53a will bottom on shoulder 69a to cause a shifting of the fulcrum to lever end 44a and a snap opening of valve member 28a. When the temperature increases, the fulcrum remains at lever end 44a but the lever starts to rotate in a reverse direction, thus backing off actuator member 53b to effect a snap closing of valve member 28a by its spring 9a, followed by a shifting of the fulcrum to lever end 46a and contra-rotation of lever end 44a, thus backing off actuator 53a and a snap closing of valve member 27a, by its spring 8a. Preferably spring 8a is somewhat lighter than spring 9a so as to assist in effecting desired sequential operation as in the preferred embodiment.

I claim:

1. In a fluid flow control device, a plurality of valves connected in parallel flow relation, means biasing each of said valves toward closed position, a floating lever operably connected to said valves for movement thereof to open position against the resistance of said means, said means offering unequal resistance to the opening of said valves whereby upon displacement of said lever said valves will be successively opened in the order of the increasing resistance offered by said means, and snap-acting means between said lever and one of said valves.

2. In a fluid control device, first and second valves connected in parallel flow relation, a spring connected to each of said valves for urging the same to closed position, a floating lever having spaced connections to said valves for movement thereof to open position against the resistance of said springs, an overcenter snap acting device mounted in the connection between said lever and said first valve to effect a snap opening thereof and offering a predetermined resistance to actuation, actuator means connected to said lever affording mechanical advantage of movement of said connections, the comparative resistance of said springs and snap acting device cooperating with said comparative mechanical advantage to produce upon movement of said actuator means in one direction a snap opening of said first valve followed by a graduated opening of said second valve and upon return movement of said lever a closing of said valves in the reverse order of their opening.

3. A thermostatically controlled fuel control device for burners of heat appliances, first and second valves connected in parallel flow relation, a spring connected to each of said valves for urging same to closed position, a lever connected to said valves for movement thereof to open position against the resistance of said springs, temperature responsive actuator means movable in accordance with temperature changes connected to said lever intermediate the connections of said lever to said valves, an overcenter snap acting device mounted in the connection between said lever and said first valve to effect a snap opening and closing of said first valve and offering a predetermined resistance to its actuation in a valve opening direction, the comparative resistance of said springs and snap acting device cooperating with the comparative mechanical advantage afforded by the connections of said snap device and valves to said lever to produce upon movement of said actuator means in one direction in response to a decreasing temperature a snap opening of said first valve to provide a minimum fuel flow to the appliance burner followed by a graduated opening of said second valve proportional to change in temperature and upon return movement of said actuator means in response to increasing temperature a graduated movement of said second valve to closed position followed by a snap closing of said first valve.

4. In a thermostatically controlled fluid device, a housing formed with inlet and discharge passages and a pair of passageways arranged in parallel flow connection therebetween, first and second valves mounted in said passageways and movable to flow open and to flow closed positions therein, spring means connected to each of said valves for urging the same to closed position, a lever having first and second connections to said first and second valves respectively, said first connection having overcenter snap means interposed therein adapted to snap open said first valve upon displacement of said first connection in a valve opening direction to overcome the resistance to actuation of said snap means, temperature responsive actuator means movable in accordance with temperature changes and being connected to said lever intermediate said first and second connections, the comparative resistance of said spring means and snap means cooperating with the comparative mechanical advantage afforded by said connections to provide upon displacement of said actuator means in one direction in response to decreasing temperature a fulcruming of said lever about said second connection to displace said first connection and snap open said first valve thereby shifting the fulcrum of said lever to said first connection upon further movement of said actuator means to thereupon graduate open said second valve proportional to the decreasing temperature, said parts being proportioned and arranged to provide upon displacement of said actuator means in a reverse direction in response to an increasing temperature a successive fulcruming of said lever upon said first and second connections respectively to effect a successive graduated and snap closing of said valves in a reverse order of their opening.

5. In a thermostatically controlled fluid device, a housing formed with inlet and discharge passages and a pair of passageways arranged in parallel flow connection therebetween, first and second valves mounted in said passageways and movable to flow open and to flow closed positions therein, spring means connected to each of said valves for urging the same to closed position, a lever having first and second connections to said first and second valves respectively, said first connection including an overcenter snap element and a snap actuator therefor connected to said valve and said lever respectively, temperature responsive actuator means movable in accordance with temperature changes and being connected to said lever intermediate said first and second connections, the comparative resistance of said spring means and snap element cooperating with the comparative mechanical advantage afforded by said connections to provide upon displacement of said actuator means in one direction in response to decreasing temperature a fulcruming of said lever about said second connection to displace said first connection and snap open said first valve, means mounted on said housing and providing a shoulder positioned in the path of movement of said snap actuator to limit the movement of said first connection and thereby shift the fulcrum of said lever to said first connection upon further movement of said actuator means to thereupon graduate open said second valve proportional to the decreasing temperature, said parts being proportioned and arranged to provide upon displacement of said actuator means in a reverse direction in response to an increasing temperature a successive fulcruming of said lever upon said first and second connections respectively to effect a successive graduated and snap closing of said valves in a reverse order of their opening.

6. In a thermostatically controlled fluid flow device, a housing formed with inlet and discharge passages and a plurality of passageways arranged in parallel flow connection therebetween, a valve mounted in each of such passageways and movable to flow open and flow closed positions therein, a spring connected to each of said valves for urging the same to closed position, a lever connected to said valves for movement of the latter to open position against the resistance of said springs, a bellows responsive to temperature changes secured to said housing and connected to said lever intermediate its connections to said valves, spring means mounted between said housing and said lever in direct opposition to said bellows and being held in compressed position thereby and being of sufficient strength to overcome the resistance of said valve springs to open said valves when expansion of said spring means is permitted by and upon contraction of said bellows, the comparative resistance of said valve springs cooperating with the comparative mechanical advantage afforded by the connections of said valves to said lever to produce on displacement of said lever by said spring means a successive opening of said valves and upon displacement of said lever by said bellows against said spring means a successive closing of said valves in reverse order.

7. In a thermostatically controlled fluid flow device, a housing formed with inlet and discharge passages and a plurality of passageways arranged in parallel flow connection therebetween, a valve mounted in each of said passageways movable to flow open and flow closed positions therein, a spring connected to each of said valves for urging the same to closed position, a thermostat bellows adapted to expand and contract in response to increasing and decreasing temperature changes respectively, spring means mounted between said housing and one end of said bellows in direct opposition thereto for compression between said bellows end and said housing, manually adjustable means carried by said housing and supporting the opposite end of said bellows and being manually displaceable relative to said housing in the direction of said spring means to control the compressive forces on said bellows and spring, means for determining operating temperatures, and a floating lever pivotally carried intermediate its ends at the connection between said bellows and spring means and having its opposite ends in juxtaposition to said valves for engagement with and displacement of said valves to effect opening and closing thereof upon contraction and expansion respectively of said bellows, said spring means having an expansion force capable of overcoming said valve springs to effect opening of said valves upon contraction of said bellows and offering a resilient cushion to the expansion of said bellows after closing of said valves, the comparative resistance of said springs cooperating with the comparative mechanical advantage afforded by the connections of said valves to said lever to provide on displacement of said lever by said spring means a successive opening of said valves and upon displacement of said lever by said bellows against said spring means a successive closing of said valves in the reverse order of their opening.

8. In a thermostatically controlled fluid flow regulating device, a housing formed with inlet and discharge passages and a pair of passageways arranged in parallel flow connection therebetween, a first valve mounted in one of said passageways and a second valve mounted in the other of said passageways, said valves being movable to flow open and flow closed positions therein, first and second springs connected to said first and second valves respectively for urging the same to closed position, a floating lever having spaced apart first and second connections to said first and second valves respectively, temperature responsive actuator means connected to said lever to afford mechanical advantage of movement of said connections and including a thermostat bellows expandable and contractible in accordance with increasing and decreasing temperatures respectively and a third spring mounted to resiliently resist the expansion of said bellows and in mutual compression therewith and being of sufficient strength to overpower said first and second springs, an overcenter snap acting device provided in said first connection to effect snap opening of said first valve and offering a predetermined resistance to its actuation in a valve opening direction, the comparative resistance of said first and second springs and said snap acting device cooperating with the comparative mechanical advantage afforded by the connections of said snap acting device and valves to said lever to produce upon movement of said actuator means in a valve opening direction in response to a decreasing temperature a snap opening of said first valve followed by a graduated opening of said second valve proportional to further decreases in temperature, and manually controlled means for adjusting the mutual compression of said bellows and third spring to determine the temperature at which said valves will be opened and closed.

9. In a thermostatically controlled fuel flow device, a plurality of valves connected in parallel flow relation, a thermostat bellows movable in response to temperature changes, force and movement transmitting means connected to and operated by said bellows and having a connection to each of said valves for applying comparative opening forces thereto, an overcenter snap acting device provided in each of said valve connections to effect snap opening and snap closing of said valves and affording a predetermined resistance to actuation, the comparative resistance of said snap acting devices cooperating with said comparative opening forces to produce upon movement of said means in one direction under the influence of said bellows responding to a decreasing temperature a snap opening of one of said valves followed upon a further predetermined decrease in temperature by a snap opening of the other of said valves and providing upon return movement of said means in response to increasing temperature a snap closing of said valves in the reverse order of their opening.

10. In a fluid flow device, a plurality of valves connected in parallel flow relation, a floating lever having spaced apart connections to said valves for movement thereof to open position, an overcenter snap acting device provided in each of said connections between said lever and said valves to effect the snap opening of the latter and offering a predetermined resistance to actuation, actuator means connected to said lever affording comparative mechanical advantage of movement of said connections, the comparative resistance of said snap acting devices cooperating with said comparative mechanical advantage afforded by said lever connections to produce upon movement of said actuator means in one direction the snap opening of one of said valves followed by a sequential snap opening of the other of said valves and providing upon return movement of said lever a closing of said valves in the reverse order of their opening.

11. In a thermostatically controlled fuel flow device for a burner of a heat appliance, first and second valves connected in parallel flow relation, a spring connected to each of said valves for urging same to closed position, a lever connected to said valves for movement thereof to open position against the resistance of said springs, temperature responsive actuator means movable in accordance with temperature changes connected to said lever intermediate the connection of said lever to said valves, an overcenter snap acting device mounted in each of the connections between said lever and said first and second valves to effect a snap opening and closing of said valves, each of said snap acting devices offering a predetermined resistance to its actuation in a valve opening direction, the comparative resistance of said springs and snap acting devices cooperating with the comparative mechanical advantage afforded by said lever connections to said snap devices and valves to produce upon movement of said actuator means in one direction in response to a decrease in temperature a snap opening of said first valve to provide a minimum fuel flow to the appliance burner followed upon a further predetermined decrease in temperature by a snap opening of said second valve and providing upon return movement of said actuator means in response to increasing temperature a snap closing of said second valve followed by a snap closing of said first valve.

12. A fluid flow control device of the character described comprising, first and second valves connected in parallel flow relation, means biasing said valves to closed position, snap acting means connected to said first valve and including an overcenter snap disk and a movable fulcrum member therefor, a lever operatively connected to said fulcrum member and said second valve, condition responsive means connected to said lever for displacing said fulcrum member to cause a snap opening of said first valve and to cause an opening of said second valve, the aforesaid parts being arranged to provide an initial displacement of said fulcrum member in a valve opening direction in advance of a displacement of said second valve to open position, and means providing a fixed stop engageable with said fulcrum member for preventing further movement after said initial movement and thereby transferring further movement of said condition responsive means to said second valve to effect sequential opening thereof.

13. A fluid flow control device of the character described comprising, first and second valves connected in parallel flow relation, means biasing said valves to closed position, snap acting means connected to said first valve and including an overcenter snap disk and a movable fulcrum member therefor, a lever having spaced apart connections to said fulcrum member and said second valve, condition responsive means movable in accordance with condition changes and connected to said lever intermediate said connections, the comparative resistance of said biasing means cooperating with the comparative mechanical advantage afforded by said connections to provide upon displacement of said condition responsive means in one direction a fulcruming of said lever about its connection to said second valve to displace said fulcrum member to cause snap opening of said first valve, means providing a fixed stop engageable with said fulcrum member to limit movement thereof and thereby transferring further movement of said condition responsive means to said second valve to effect sequential opening thereof, said parts being arranged to provide upon reverse movement of said condition responsive means a successive graduated and snap closing of said second and first valves respectively.

14. In a fluid flow control device, a plurality of valves connected in parallel flow relation, means biasing each of said valves toward closed position, a floating lever connected to said valves for movement thereof to open position against the resistance of said means, spring means connected to said lever and having strength sufficient to effect said movement thereof to open said valves against the resistance of said biasing means, and condition responsive means connected to said lever for effecting movement thereof in opposition to said spring means to permit closing of said valves by said biasing means, said biasing means offering unequal resistance to the opening of said valves to thereby effect upon movement of said lever by said condition responsive means a successive opening of said valves and upon movement of said lever by said spring means a successive closing of said valves in the reverse order of their opening.

References Cited in the file of this patent

UNITED STATES PATENTS

| | | |
|---|---|---|
| 1,344,555 | Mogni | June 22, 1920 |
| 1,533,322 | Lewis | Apr. 14, 1925 |
| 1,620,624 | Allen | Mar. 15, 1927 |
| 1,988,345 | Vaughn | Jan. 15, 1935 |
| 2,004,597 | Birtch | June 11, 1935 |
| 2,228,198 | Cerny | Jan. 7, 1941 |
| 2,237,720 | Waddell | Apr. 8, 1941 |